Sept. 20, 1955  E. S. JOHNSON  2,718,296
PORTABLE CONVEYOR
Filed Oct. 4, 1948  5 Sheets-Sheet 1

INVENTOR.
EARL S. JOHNSON
BY Paul, Paul & Moore
ATTORNEYS

Sept. 20, 1955     E. S. JOHNSON     2,718,296
PORTABLE CONVEYOR
Filed Oct. 4, 1948     5 Sheets-Sheet 2
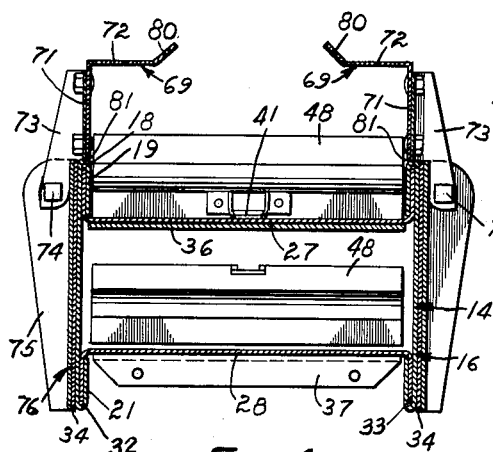
Fig. 4
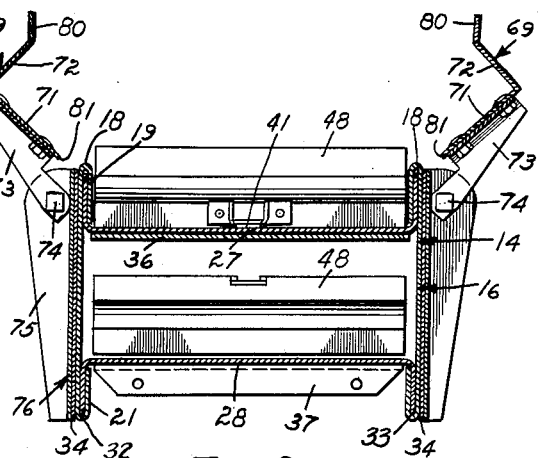
Fig. 3
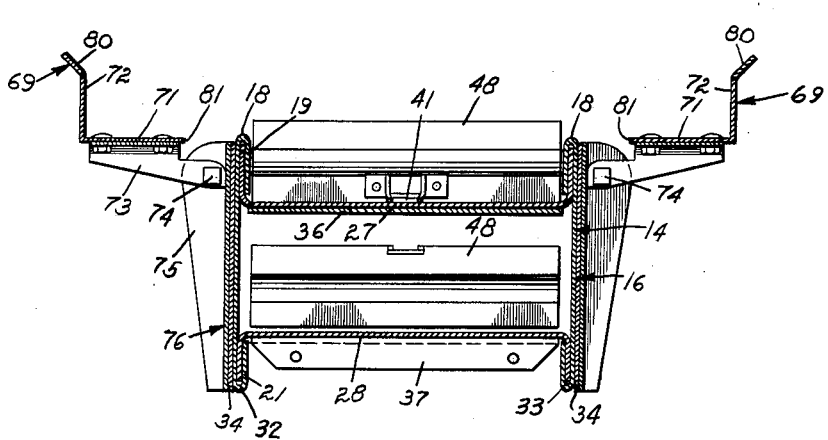
Fig. 2
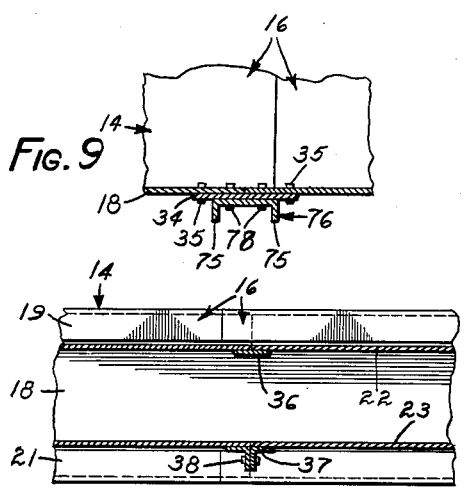
Fig. 9
Fig. 10
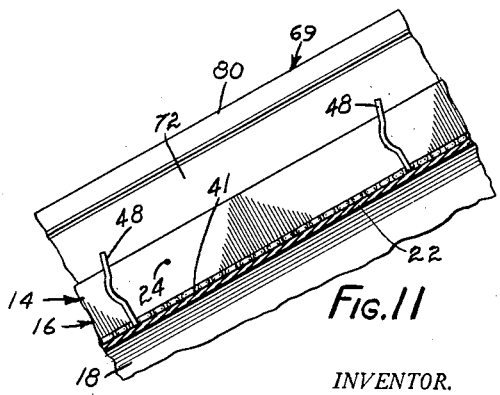
Fig. 11
INVENTOR.
EARL S. JOHNSON
BY Paul, Paul & Moore
ATTORNEYS

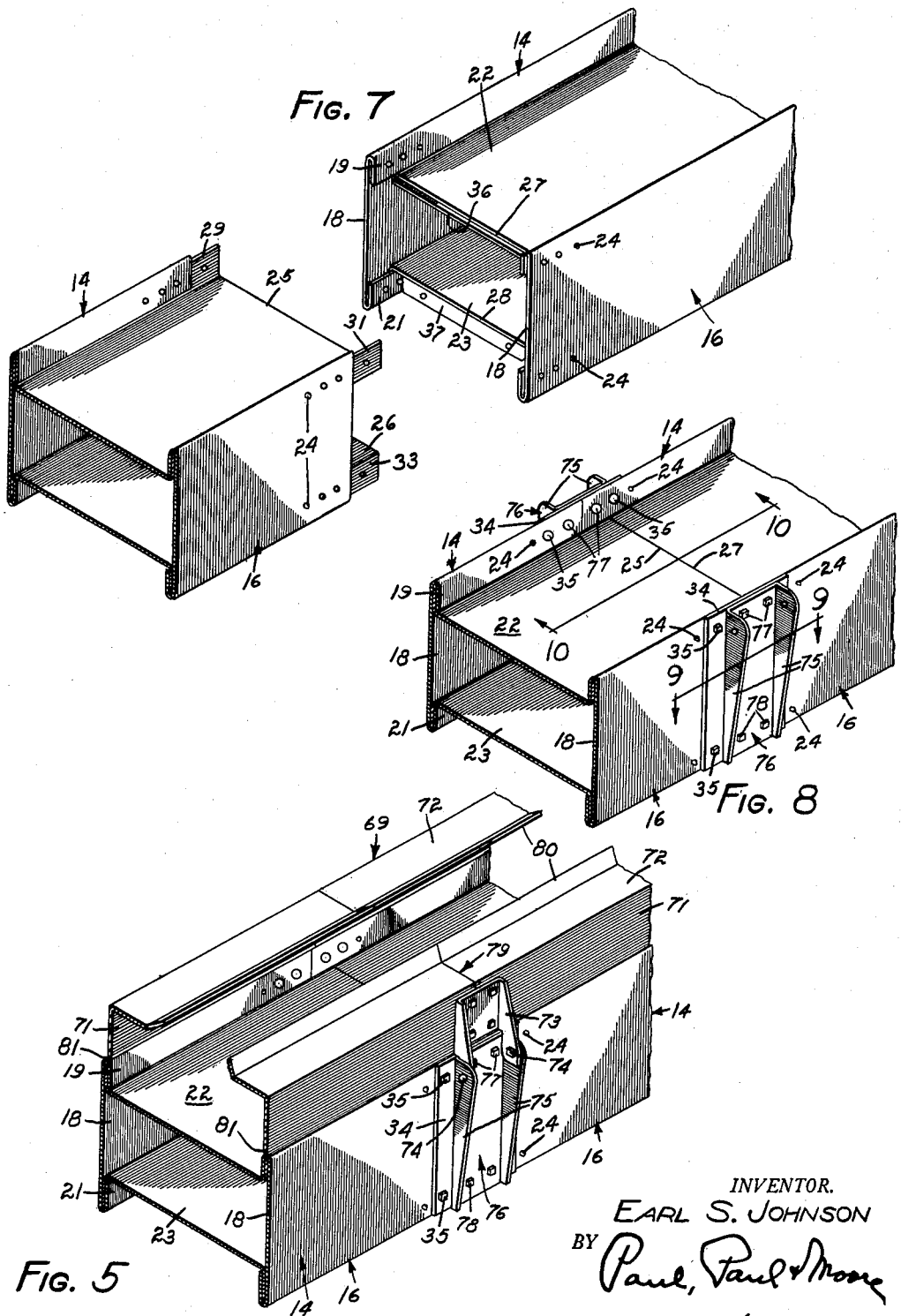

Sept. 20, 1955     E. S. JOHNSON     2,718,296
PORTABLE CONVEYOR

Filed Oct. 4, 1948     5 Sheets-Sheet 4

INVENTOR.
EARL S. JOHNSON
BY Paul, Paul & Moore
ATTORNEYS

Sept. 20, 1955      E. S. JOHNSON      2,718,296
PORTABLE CONVEYOR

Filed Oct. 4, 1948      5 Sheets-Sheet 5

INVENTOR.
EARL S. JOHNSON
BY
ATTORNEYS

United States Patent Office 2,718,296
Patented Sept. 20, 1955

2,718,296

PORTABLE CONVEYOR

Earl S. Johnson, Minneapolis, Minn., assignor to Better-Bilt Manufacturing Company, Minneapolis, Minn., a partnership Application October 4, 1948, Serial No. 52,718

5 Claims. (Cl. 198—204)

This invention relates to new and useful improvements in portable loaders and elevators utilized in the loading of trucks, wagons and the like, and which may also be used for elevating hay, small grain, corn and many other farm products whereby the operation of loading such materials and transferring them from one place to another may be greatly expedited.

One of the principal objects of the present invention is to provide a portable conveyor which is extremely light in weight whereby it may readily be transported from one place to another by simply coupling it to a truck or automobile by means of a conventional trailer hitch, such as are well known in the art.

A further object is to provide a conveyor made up of a plurality of sections whereby the overall length of the conveyor may readily be varied by increasing or decreasing the number of sections thereof.

A further and more specific object of the invention resides in the unique construction of the composite conveyor which comprises a plurality of independent sections having means at their ends for detachably securing them together, and said sections being constructed of sheet metal and being substantially box-shaped in cross section, thereby to provide a structure which is extremely light in weight and at the same time has great strength and resistance to flexing or bending under heavy loads.

A further object resides in the provision of a conveyor which readily lends itself for handling almost any size of product from small grains to large bulky bales of hay, the conveyor being so constructed that once it has been adjusted for handling a product of certain characteristics, such product or material may be expeditiously and economically conveyed to any desired elevation within the reach of the conveyor.

A further and more specific object of the invention resides in the construction of the side walls of the conveyor, each of which is provided with a hinged member, preferably of angle iron cross-section, which members are so pivoted to the side walls of the conveyor that they may be outwardly swung for use in handling and conveying large objects such as bales of hay and straw, or said pivoted side wall members may be swung inwardly to partially enclose the conveyor flights and chain, whereby the conveyor may be used for conveying small grains, such as wheat, oats, corn, and the like, and which sometimes have a tendency to scatter more or less when the conveyor is operated at high speed.

A further object resides in the specific construction of the conveyor chain and the flights secured thereto, said flights being so arranged that their upper edges project slightly above the side walls of the conveyor proper, and also above the normally horizontal walls of the hinged side wall members, whereby the conveyor flights may support the major portions of the weights of large bulky articles conveyed by the conveyor, and which may extend outwardly beyond the width of the trough of the conveyor proper, and also whereby such articles, as bales of hay, straw, and large bags, when carried upwardly by the conveyor, may be supported in part upon the upwardly projecting edges of the side walls of the conveyor, and whereby said edges cooperate with the flights of the conveyor chain to propel the load upwardly on the conveyor.

A further object is to provide a portable conveyor comprising a light-weight structural supporting frame which preferably is composed largely of steel tubing to gain lightness, and at the same time maximum strength; and said supporting frame being provided with suitable carrying wheels and coupling means whereby it may be coupled to a propelling vehicle, such as an automobile or truck, and said frame having an engine mounted thereon for driving the conveyor chain, and whereby the elevator may be operated by its own source of power.

Other objects of the invention reside in the unique construction of the hinged side wall members of the conveyor, whereby the conveyor may be adapted for handling various types of commodities; in the location of the pivots for supporting the hinged side wall members whereby said members may be swung outwardly into horizontal positions to increase the carrying width of the conveyor and also whereby said members may be swung inwardly into vertical positions directly over the side walls of the conveyor proper, thereby to substantially enclose the conveyor whereby it is particularly well suited for conveying small grains and the like; and in the provision of a general utility conveyor which provides the utmost in strength and efficiency, and which is extremely light and readily maneuverable, whereby a single person may easily move it about with respect to a bin or other place where such a conveyor is to be used.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 2 is a cross-sectional view substantially on the line 2—2 of Figure 1, showing the rugged construction of the body of the conveyor, and its hinged side walls swung outwardly to their maximum width;

Figure 3 is a view similar to Figure 2 showing the side walls in their intermediate positions;

Figure 4 is a view similar to Figures 2 and 3 but showing the conveyor side walls swung inwardly to their innermost positions;

Figure 5 is a perspective view showing a portion of the conveyor body proper, including the hinged side walls in the positions shown in Figure 4, and with the conveyor chain omitted;

Figure 7 is a view similar to Figure 6 showing adjacent conveyor sections spaced from one another;

Figure 8 is a view showing the connection between adjacent conveyor sections completed to provide, in effect, an integral unit;

Figure 9 is a detail sectional view on the line 9—9 of Figure 8;

Figure 10 is a longitudinal sectional view on the line 10—10 of Figure 8;

Figure 11 is a fragmentary detail sectional view showing the flights secured to the conveyor chain;

The novel conveyor herein disclosed is shown comprising a skeleton-like frame comprising tubular side rails 2—2, having their rear ends secured to a cross member 3 provided at its ends with suitable carrying wheels 4. Diagonal braces 5 are interposed between the cross member 3 and the side rails 2 to strengthen the structure.

Figures 1, 6:
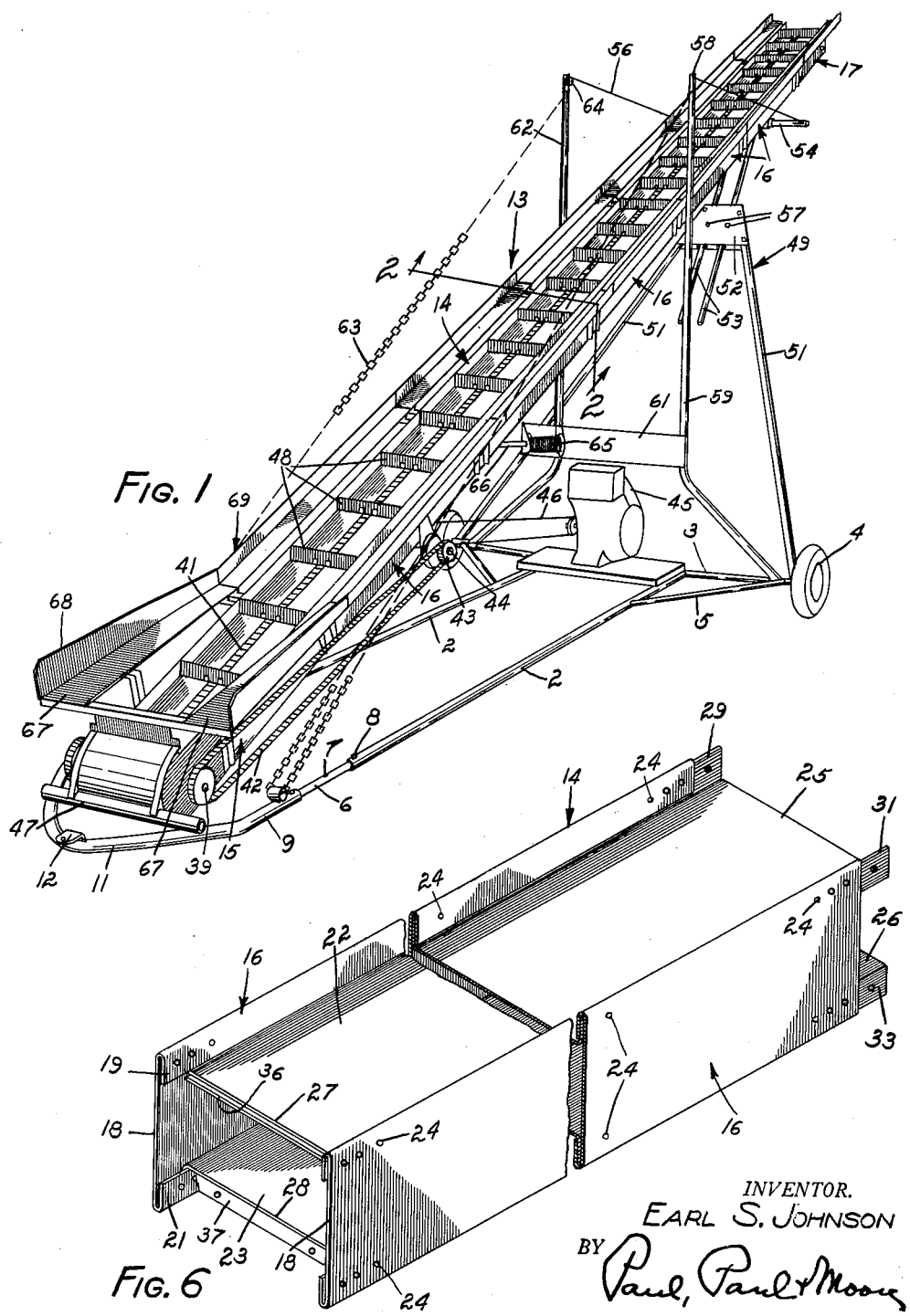
Figure 1 is a perspective view of the novel elevator herein disclosed.
Figure 6 is a view similar to Figure 5 with the side walls and connecting brackets detached from the sections of the conveyor body to more clearly illustrate how the box-like conveyor sections are joined together.

Slidably received in the front ends of the side rails 2—2 are suitable connecting members 6 having spaced apertures 7 therein adapted to receive bolts or pins 8, as best illustrated in Figure 1. The opposite ends of the connecting members 6 are secured to the rearwardly directed end portions 9 of a front member 11 having a suitable coupling member 12 secured thereto, whereby the front end of the supporting frame may be coupled to a suitable propelling vehicle, such as a truck, tractor, or automobile, when it is desired to transport the conveyor from one place to another. The connecting members 6 provide means whereby the overall length of the supporting frame may be varied, as may be required when varying the length of the conveyor, next to be described.

The conveyor, generally designated by the numeral 13, is mounted on the supporting frame and comprises an elongated body 14. The body 14 is shown composed of a front section 15, intermediate sections 16, and an upper end section 17, all of which are secured together in endwise relation to provide an elongated, hollow supporting structure constituting the main body of the elevator. The overall length of the elevator proper may be varied by varying the number of intermediate body sections 16, embodied therein.

The sections 16 and 17 are shown constructed of sheet metal, and are preferably box-shaped in cross-section for the purpose of increasing the strength and rigidity of the elongated body 14 of the conveyor.

All sections 15, 16, and 17 are constructed in more or less the same manner, but in the application drawings the intermediate section 16 only will be described in detail.

Each such section is shown comprising upright side walls 18—18 having their upper and lower edges inwardly turned, as shown at 19 and 21, respectively, to provide hook-like elements adapted to receive the opposed flanges provided on an upper plate 22 and lower plate 23. The opposed flanges of the upper and lower plates 22 and 23 are secured to the hook-like elements 19 and 21 of the side walls 18, by suitable rivets or bolts, as indicated at 24, or by electric spot welding, thereby to provide a very rigid box-like structure.

The upper and lower walls or plates 22 and 23 of the body 14 of the conveyor are offset in a longitudinal direction from the side walls 18, as best illustrated in Figures 6 and 7, whereby the right-hand ends 25 and 26 of the upper and lower walls 22 and 23, respectively, project beyond the ends of the side wall members 18—18. Because of such projection of the ends 25 and 26, the opposite ends 27 and 28 of the walls 22 and 23 are spaced inwardly from the adjacent ends of the side walls 18—18, whereby the upright flange portions 29 and 31 of the upper plate 22, and the depending flanges 32 and 33 of the lower plate 23 cooperate with the hook-shaped wall portions 19 and 21 to provide means for coupling together the body sections 16 of the elevator, as clearly illustrated in Figures 5 and 8.

In other words, the flanges 29, 31 and 32 and 33 of one conveyor section are adapted for interlocking engagement with the hook-shaped portions 19 and 21 of the adjacent end of a conveyor section, and are secured in such interlocked engagement by suitable means next to be described.

After two conveyor body sections have been interconnected, as above described, a coupling plate 34 is fitted against the side walls 18 of each section over the joints provided between adjacent sections, as illustrated in Figures 5 and 8. The plates 34 are secured to the side walls 18 by suitable bolts 35, whereby the conveyor body units 16 when so coupled together, cooperate to provide a very substantial and rugged supporting structure for the conveying means, as will readily be understood by reference to Figures 5 and 8. The ends of adjacent horizontal walls 22 of the conveyor body sections are retained in alignment with one another by metallic strips or plates 36, shown secured to one end of each upper plate 22, as shown in Figures 6, 7 and 10.

The adjacent ends of the lower horizontal walls 23 of adjacent conveyor sections or units 16 are provided with cross angles 37 adapted to abuttingly engage one another, when adjacent sections are interlocked with one another, whereby bolts 38 may secure together the angles 37 to thereby provide a very rigid structural conveyor body.

The lower or front section 15 of the elevator body is shown having a cross shaft 39 mounted therein to which is secured a suitable sprocket, not shown, with which a conveyor chain 41 has a running connection. The shaft 39 may be driven by a chain 42 from a sprocket 43 secured to a shaft 44 which in turn is driven from a suitable power source, such as an internal combustion engine 45, through an endless belt 46 shown in Figure 1. The front section 15 of the elevator is shown having a cross member 47 secured thereto, the ends of which engage the U-shaped member 11 of the supporting frame. The cross member 47 may be spot welded to the frame member 11 to simplify construction.

The conveyor chain 41 has a running connection with a sprocket, not shown, provided at the upper end of the conveyor section 17. Spaced flights 48 are secured to the chain 41 adapted to engage articles delivered onto the lower end of the elevator and convey them upwardly to the upper end of the elevator for discharging into a suitable receiving means, not shown. If desired, two conveyor chains 41, arranged in spaced parallel relation, may be utilized in lieu of the single chain shown in Figure 1 of the application drawings.

Figure 12:
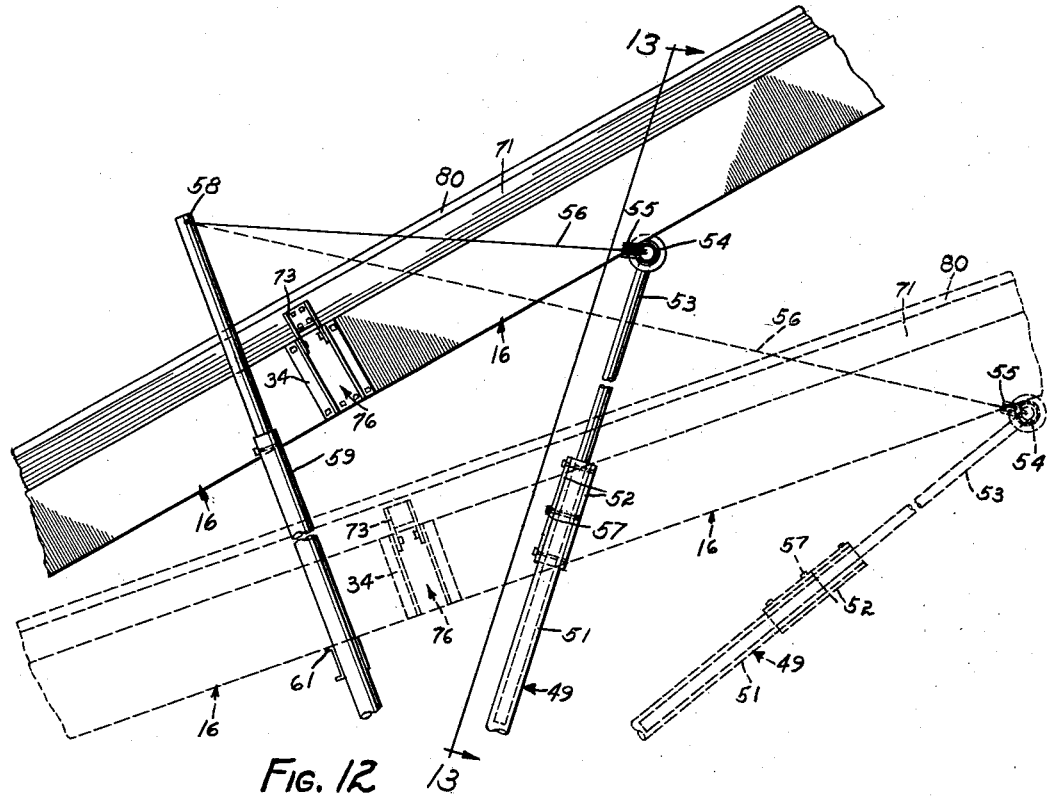
Figure 12 is a fragmentary view showing the upper portion of the conveyor.
Figure 13:
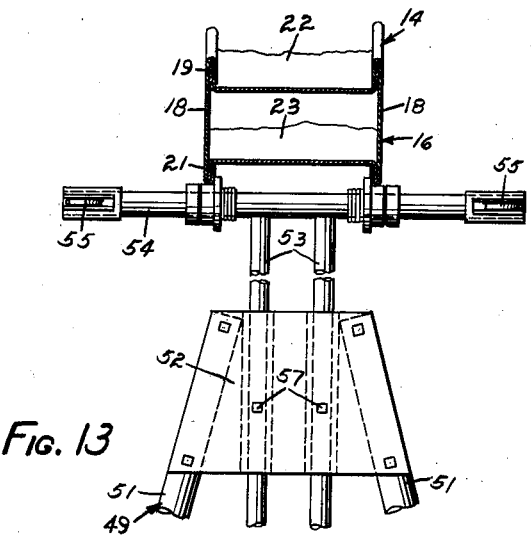
Figure 13 is a detail sectional view substantially on the line 13—13 of Figure 12.

The upper end of the conveyor is adjustably supported upon a structural frame or boom, generally designated by the numeral 49, comprising spaced members 51 having their lower ends suitably secured to the rear cross member 3 of the structural frame. The upper ends of the members 51 are secured together by suitable spaced plates 52, which cooperate to provide guides for a pair of rods 53 disposed in parallel relation and provided at their upper ends with a cross member 54. Suitable sheaves 55 are mounted in the ends of the member 54 and have running connections with a cable 56, as best illustrated in Figure 12. The cross member 54 is preferably tubular in cross section, whereby the cable 56 may pass therethrough, as will be understood by reference to Figure 12. Suitable bolts 57 secure the rods 53 in adjusted position between the guide plate 52. One end of the cable 56 is secured at 58 to the upper end of an upright frame member 59 which extends upwardly from the rear cross member 3, as best shown in Figure 1. A cross member 61 secures the upright members 59 to a similar upright frame member 62, having its lower end secured to the cross member 3 at the opposite side of the apparatus. The frame members 59 and 62 are disposed in laterally spaced relation, as shown in Figure 1.

Chains or cables 63 have their upper ends secured to the upright frame members 59 and 62, and their lower ends are adjustably secured to the side frame members 9 of the structural frame of the apparatus, thereby to retain the uprights 59 and 62 in their proper positions, as will be understood by reference to Figure 1. The free end of the cable 56 passes over a sheave 64 mounted at the upper end of the upright 62, and thence downwardly into engagement with a winding drum 65, shown secured to the cross member 61. A suitable crank 66, partially shown in Figure 1, provides means whereby the drum may readily be manipulated to raise and lower the upper end of the elevator, as will be understood by reference to Figure 1.

Another important feature of the invention resides in the construction of the side walls or rails of the elevator, whereby the elevator readily lends itself for use in handling various types and sizes of merchandise and articles.

The leading section 15 of the body of the elevator is shown provided with laterally disposed boards 67—67, having upright side walls 68 for guiding the articles into engagement with the flights 48 of the elevator, as will be understood by reference to Figure 1.

As here shown, the transverse width of the table top formed by the boards 67 is relatively greater at the extreme lower end of the elevator than it is where the side boards 68 join angular side wall members 69 of the elevator sections 16 and 17. The guide boards 67 and side walls 68 may be suitably secured to angular side wall members 69 of the leading body section 15. The angular wall members 69 of the following sections are mounted for pivotal movement about longitudinally extending axes disposed at the sides of the elevator, whereby the pivotal side wall members 69 may be swung outwardly to the positions shown in Figures 1 and 2, or to their innermost positions shown in Figure 4, or to intermediate positions, as shown in Figure 3.

The side wall members 69 are preferably of angle iron cross section, and comprise horizontal and upright wall portions 71 and 72, respectively. The horizontal wall portions 71 are secured to brackets 73 mounted on pivots 74 supported in outwardly extending spaced flanges 75 of suitable U-shaped brackets 76. The brackets 76 are shown seated against the coupling plates 34 and are secured thereto and to the side walls 18 by means of bolts 77 and 78, best shown in Figures 5 and 8. The angle iron side wall members 69 are preferably made in sections corresponding substantially to the length of the body sections 16, and are joined together at the brackets 73, as shown at 79 in Figure 5.

By thus adjustably mounting the side wall members 69, they may readily be secured in any desired position by the simple manipulation of the pivot bolts 74. The relationship between the inner edges 81 of the horizontal portions 71 of the side wall members 69 and the pivot bolts 74 is important because when the conveyor is utilized for conveying grain and other materials of a similar nature, the side walls must be sufficiently tight to prevent the material from discharging from the sides of the elevator when conveying such material upwardly thereon.

By referring to Figure 4 it will be noted that when the side wall members 69 are swung inwardly as there shown, the normally horizontal wall portions 71 thereof are vertically disposed, and the inner edges 81 of the said wall portions 71 will then abuttingly engage the upper edges of the side walls 18 of the body of the elevator, whereby the joints between the side wall members 69 and the elevator walls 18 are sealed against any possible danger of leakage of grain from the elevator through its side walls.

When the elevator is to be used for elevating corn or other relatively larger commodities, better results may be obtained with the side wall members adjusted to the positions shown in Figure 3. In Figure 2 the side walls or rails 69 are shown in their outermost positions, as when elevating such material as bales of hay or large sacks, and the like. When conveying such articles the major weight of the article will be carried directly upon the horizontal wall portion 71 of the side wall members 69 and upon the upper edges of the side walls 18 of the body sections 16, whereby the flights 48 of the elevator chain 41 are relieved of a substantial portion of the weight of the load. The upper marginal edges of the side wall members 69 of the conveyor are preferably outwardly bent, as indicated at 80.

Figure 17:
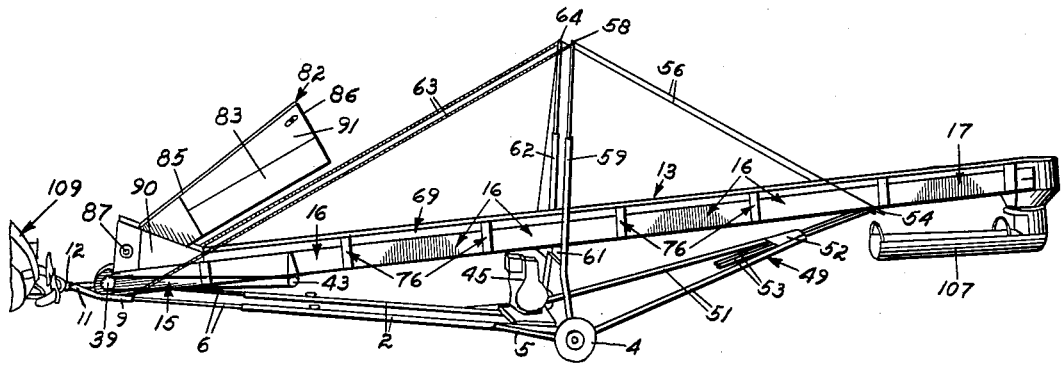
Figure 17 is a side elevation of the entire apparatus, showing it folded into collapsed form to facilitate transporting it from one place to another.
Figure 15:
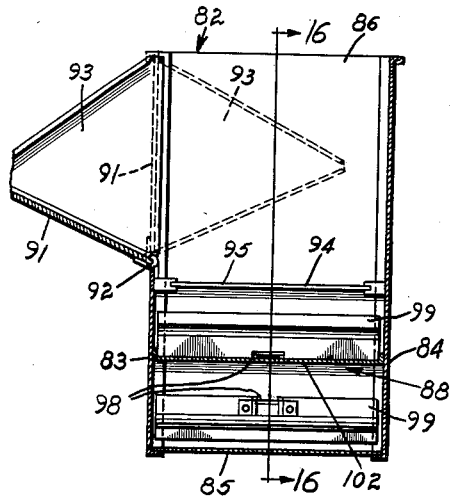
Figure 15 is a cross-sectional view on the line 15—15 of Figure 14, showing side wall of its feeding conveyor lowered or swung outwardly to facilitate discharging the material onto the elevator.
Figure 16:
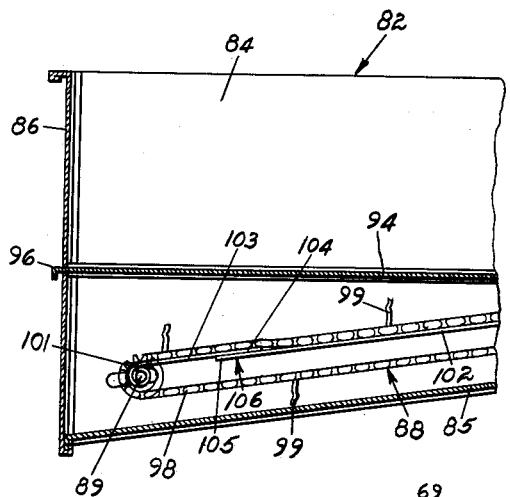
Figure 16 is a longitudinal sectional view on the line 16—16 of Figure 15, showing the belt take-up means.
Figure 14:
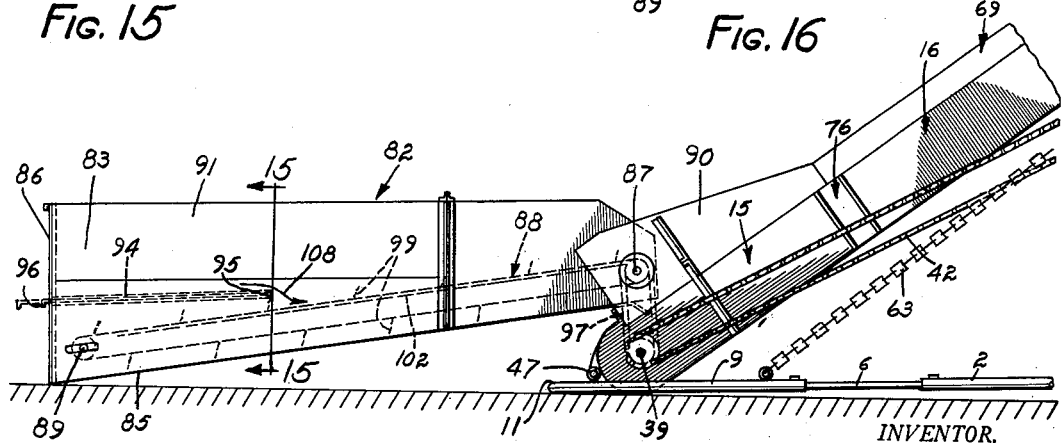
Figure 14 is a side elevational view of the lower end of the elevator, showing the feeder conveyor pivoted thereto and in operative position.

Another feature of the invention resides in the provision and construction of a device for controlling the delivery of material into the lower end of the elevator. This device or feeder section is best illustrated in Figures 14, 15 and 16 and is generally designated by the numeral 82. It is shown comprising spaced side walls 83 and 84 secured together in spaced relation by a bottom wall 85 and an end wall 86. The feeder section 82 is pivotally connected to the lower end of the elevator, as shown in Figure 14, whereby the feeder section 82 may be folded over onto the lower end of the elevator, when the apparatus is to be transported from one place to another, as shown in Figure 17.

To thus pivotally connect the feeder section 82 to the elevator, the outwardly flared wall members 67 and 68 are detached from the elevator, and auxiliary side walls 90 are substituted therefor, as shown in Figure 14. The pivotal connection between the feeder section 82 and the elevator may consist of a cross shaft 87, mounted in suitable bearings provided in the auxiliary side walls 90 of the elevator. This shaft may support one end of a suitable endless conveyor, indicated in dotted lines in Figure 14, and generally designated by the numeral 88. The opposite end of the conveyor 88 is supported upon a shaft 89 mounted for relative adjustment in the side walls 83 and 84 of the feeder section 82, whereby the endless conveyor 88 may be maintained at the proper tension.

The side wall 83 of the feeder section 82 is shown provided with a hinged door or gate 91 adapted to swing about a pivot 92 whereby it may be tilted outwardly to the inclined position shown in Figure 15 to facilitate delivering the material onto the endless conveyor 88 of the feeder section, as will be understood. The pivoted gate 91 is provided with suitable end walls 93 to guide the material into the feeder section 82, when unloading material into the feeder. When the gate 91 is in closed position, as indicated by dotted lines in Figure 15, its end walls 93 are swung into positions over the conveyor 88, as shown.

Another feature of the invention resides in the provision of means in the feeder section for controlling the delivery or flow of the material from the feeder section into the lower end of the elevator. To thus control the flow of material, a plate 94 is mounted for sliding movement in suitable guides provided on the side walls 83 and 84 of the feeder section 82, as indicated in Figure 14.

The inner end 95 of the plate 94 extends inwardly to substantially the intermediate portion of the feeder section and its opposite end is provided with a hand grip 96, whereby an operator may readily grasp the hand grip 96 and longitudinally slide the plate 94 in its guides to increase or decrease the flow of material from the feeder section 82 into the lower end of the elevator. The plate 94 overlies a portion of the surface of the conveyor 88, and thereby renders such portion ineffective to convey material. When the plate 94 is pulled outwardly or to the left, when viewed as illustrated in Figure 14, the effective area of the conveyor 88 is increased whereby the flow of material into the elevator is correspondingly increased.

The shaft 87 of the endless conveyor 88 may be operatively driven from the shaft 39 at the lower end of the elevator by a suitable chain drive 97, indicated in dotted lines in Figure 14.

The endless conveyor 88 of the feeder section 82 may comprise one or more endless chains 98, shown in Figures 15 and 16, having flights 99 secured thereto in spaced relation adapted to engage the material in a manner similar to the conveyor 41 of the elevator. When such a conveyor is utilized, sprockets 101 are secured to the shaft 89, as shown in Figure 16. The feeder section has a plate 102 secured therein in fixed position directly below the upper run of the conveyor chains or belt 88, which constitutes a bottom for the conveyor. A second, relatively smaller or shorter plate 103, has one end anchored to the cross shaft 89, and its opposite end portion 104 overlaps the adjacent end portion 105 of the plate 102, as indicated at 106 in Figure 16. The overlapping arrangement of the plate portions 104 and 105 permits the shaft 89 to be relatively adjusted in its supporting walls 83 and 84 to maintain the endless conveyor 88 at the proper tension.

A suitable discharge spout 107 may be provided at the upper or discharge end of the elevator, as shown in Figure 17, to conduct the material away from the elevator and into a suitable receiving means. The discharge chute or spout 107 is particularly useful when handling small grains, as will be understood. The spout 107 is mounted for swinging movement whereby it may be swung to any desired position within its reach. When the apparatus is not in use, the spout 107 may be swung to an inoperative position beneath the upper end of the elevator, as shown in Figure 17.

When the novel apparatus herein disclosed is to be used for elevating small grains such as wheat, oats, corn, etc., from a wagon, for example, into a bin, the feeder section 82 is utilized, and the pivoted gate 91 is lowered to the full line position shown in Figure 15. The grain is then discharged from the wagon box into the chute-like structure formed by the hinged gate 91 and its end wall 93, from whence a portion of the grain may drop directly onto the conveyor belt 88. A portion of the material, however, will drop onto the plate 94 which controls the effective area of the endless conveyor 88 of the feeder section 82.

If it is desired to increase the flow of material into the elevator, the slide 94 is partially withdrawn from its guides 95 to thereby expose a greater area of the conveyor belt 88, whereby the flow of grain to the conveyor is correspondingly increased.

In Figure 14 the arrow 108 indicates the flow of material from the slide 94 onto the conveyor 88. If the apparatus is to be used for elevating bales of hay or straw, or other large bulky commodities, the gate 91 of the feeder section 82 may remain in its open position as shown in full lines in Figure 15, to facilitate the delivery of the bales onto the conveyor belt 88 of the feeder section. In most cases, however, when handling bales of hay and the like, the feeder section 82 may be dispensed with, as such bales or large sacks may readily be placed directly into the receiving end of the elevator, as will be understood by reference to Figure 1.

Another feature of the invention resides in the mounting of the body of the elevator upon its supporting frame. By reference to Figures 1 and 17, it will be noted that when the elevator is lowered to the position shown in Figure 17, the elongated body or supporting member 13 of the elevator will be relieved of all deflective strains, as the three-point suspension provided by the supporting structure will uniformly distribute transportation strains throughout the length of the supporting member 13. In other words, by referring to Figure 17, it will be noted that the front end of the elevator is supported upon the U-shaped frame portion 9, and the intermediate portion of the elevator may be supported upon the cross member 61 of the frame, whereas the rear end of the elevator is supported by the boom 49. Thus the elevator is so supported along its length that it may readily be transported from one place to another without danger of becoming damaged from transportation strains even when traveling over rough surfaces or ground.

The novel apparatus herein disclosed is very simple and inexpensive in construction and is extremely light in weight in comparison to the load which may be elevated thereby. The box-like cross section of the elevator body provides the utmost in strength and rigidity, and results in the provision of an apparatus which readily resists twisting and torsional strains, whereby the elevator will operate freely without binding, regardless of the length thereof. The slidable mounting of the supporting rods 53 at the upper end of the V-shaped frame or boom 49 is also of importance in that it makes it possible to support the elevator adjacent to its upper end regardless of its length.

When the elevator is to be transported from one place to another, as hereinbefore stated, and as shown in Figure 17, the winding drum 65 is manipulated to lower the boom 49, whereby the upper end of the elevator gradually descends to its lowermost position into engagement with the cross member 61. When the elevator is so positioned, the conveyor and its supporting structure is sufficiently balanced upon the wheels 4 to enable a single operator to readily couple the end of the apparatus to a towing vehicle or truck 109 without assistance as shown in Figure 17.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an apparatus of the class described, a wheeled frame having means at its forward end for coupling it to a propelling vehicle, an elevator mounted on said frame and comprising an elongated supporting member having one end pivotally supported on the frame and having its opposite end adapted for vertical adjustment to raise or lower the discharge end of the elevator, said supporting member being box-shaped in cross-section and comprising laterally spaced side walls and vertically spaced upper and lower walls, said side walls extending above said top wall and cooperating therewith to provide a trough-like structure, an endless conveyor chain mounted on said member and having its upper run supported on said upper wall substantially the length of the elevator, spaced flights secured to the conveyor chain and substantially engaging the top wall of said member and extending from side wall to side wall thereof, whereby articles or material delivered onto the upper surface of said member may be conveyed by said flights to the upper end of the elevator, and side rails of angle iron cross-section pivoted to the side walls of said member and adapted for lateral swinging movement to adapt the conveyor for handling products of widely varying sizes, said rails when swung inwardly over the conveyor having elongated wall portions disposed directly over the conveyor side walls and forming upward extensions of said walls, and having other wall portions extending inwardly and partially enclosing the conveyor, and the pivoted axes of said side rails being spaced downwardly from the upper edges of the conveyor side walls whereby when said side rails are swung outwardly, the wall portions thereof which form upward extensions of the conveyor side walls when said side rails are swung inwardly, will form outwardly extending wall portions disposed in a plane intercepting the upper edges of the conveyor side walls, and the remaining wall portions of said side rails forming elongated upright auxiliary side walls for the conveyor which are spaced outwardly from the conveyor side walls to widen the effective carrying width of the conveyor.

2. In an apparatus of the class described, a wheeled frame, an elevator having one end pivotally mounted on said frame and having its opposite end adapted for swinging movement in a vertical plane to raise or lower the discharge end of the elevator, said elevator comprising an endless conveyor chain and a supporting member therefor, said supporting member being formed from a plurality of elongated sections having means for detachably securing them together in end to end relation to provide a composite supporting structure, brackets secured to the side walls of said sections at the ends thereof and overlapping and concealing the joints therebetween and preventing accidental disengagement of said sections from one another, and side rails pivoted to said brackets for swinging movement inwardly over the conveyor or outwardly therefrom, the pivoted axes of said side rails being spaced downwardly from the upper edges of the conveyor side walls, said side rails, when in their innermost positions, having elongated wall portions disposed in the planes of the conveyor side walls and extending upwardly therefrom to increase the effective height of said walls, and said side rails having other elongated wall portions extending inwardly over the conveyor, cooperating to partially enclose the conveyor whereby it may be utilized for conveying small grains, and the like, and said rails when swung outwardly adapting the elevator for handling large objects such as bales of hay and the like, said side rails being made sectional whereby their overall length may be varied to correspond to the overall length of the elevator.

3. A portable conveyor comprising a supporting frame, an elongated supporting member having one end pivoted to said frame and its opposite end arranged for swinging movement in a vertical plane, rotatable elements at the ends of said supporting member, an endless conveyor chain engaged with said rotatable elements, said supporting member being box-shaped in cross section and comprising vertically spaced walls having their side edges secured to laterally spaced side walls, the upper marginal portions of said side walls extending above the upper wall of said vertically spaced walls and cooperating therewith to form a trough for the conveyor, brackets secured to said side walls, side rails pivoted to said brackets for swinging movement inwardly and outwardly relative to the longitudinal centerline of the conveyor, the pivoted axes of said side rails being spaced downwardly from the upper edges of the conveyor side walls, each side rail comprising angularly disposed wall portions whereby when said rails are swung inwardly over the conveyor trough, each rail will have a wall portion forming an upward extension of its respective conveyor side wall and will have another wall portion extending inwardly over the conveyor trough to partially enclose it, and each of said side rails, when swung outwardly, will have wall portions disposed in the plane of the upper edges of the conveyor side walls and spaced apart from and will have other vertically disposed wall portions spaced outwardly from the conveyor side walls, thereby to widen the effective load-supporting width of the conveyor.

4. In an apparatus of the class described, a wheeled frame, an elevator comprising an elongated supporting member having one end pivotally mounted on said frame and having its opposite end mounted for up and down adjustment, said supporting member being composed of a plurality of elongated box-like sections, each comprising vertically spaced bottom and top walls and spaced side walls, said bottom and top walls having their marginal side edges interlocked with the marginal edges of said side walls to provide in effect an integral structure, and the bottom and top walls being offset from the side walls in a longitudinal direction, whereby the corresponding ends of the bottom and top walls of each section project beyond the side walls thereof for interlocking engagement with means provided in the projecting ends of the side walls of an adjacent section, thereby to secure said sections together to provide an elongated composite supporting member.

5. A portable conveyor comprising a supporting frame, an elongated supporting member having one end pivoted to said frame and its opposite end arranged for swinging movement in a vertical plane, rotatable elements at the ends of said supporting member, an endless conveyor chain engaged with said rotatable elements, said supporting member being box-shaped in cross section and comprising vertically spaced walls having their side edges secured to laterally spaced side walls, the side walls being formed of strips of sheet metal having their upper and lower marginal edge portions folded over upon themselves to provide channels for receiving flanges formed on the vertically spaced wall portions of said supporting member, the upper marginal portions of said side walls extending above the upper wall of said vertically spaced walls and cooperating therewith to form a trough for the conveyor, brackets secured to the side walls, side rails pivoted to said brackets for swinging movement inwardly and outwardly relative to the longitudinal centerline of the conveyor, each side rail comprising angularly disposed wall portions whereby when said rails are swung inwardly over the conveyor trough, each rail will have a wall portion forming an upward extension of its respective conveyor side wall and will have another wall portion extending inwardly over the conveyor to partially enclose it, and each of said side rails, when swung outwardly will have wall portions disposed in the plane of the upper edges of the conveyor side walls and will have other vertically disposed wall portions spaced outwardly from the conveyor side walls, thereby to widen the effective load-supporting width of the conveyor.

References Cited in the file of this patent

UNITED STATES PATENTS

| Number | Name | Date |
|---|---|---|
| 635,809 | Richardson | Oct. 31, 1899 |
| 697,578 | Weaver | Apr. 15, 1902 |
| 728,390 | Graham | May 19, 1903 |
| 809,373 | Hof et al. | Jan. 9, 1906 |
| 947,592 | Gilman | Jan. 25, 1910 |
| 1,048,124 | Ashworth | Dec. 24, 1912 |
| 1,049,327 | Adams | Jan. 7, 1913 |
| 1,082,908 | Read | Dec. 30, 1913 |
| 1,095,077 | Brown et al. | Apr. 28, 1914 |
| 1,114,425 | Adams | Oct. 20, 1914 |
| 1,854,561 | Owens et al. | Apr. 19, 1932 |
| 1,917,134 | Levin | July 4, 1933 |
| 2,244,364 | Holland-Letz | June 3, 1941 |
| 2,356,434 | Russell | Aug. 22, 1944 |

FOREIGN PATENTS

| Number | Country | Date |
|---|---|---|
| 396,382 | Great Britain | July 27, 1933 |